(12) United States Patent
Tanner et al.

(10) Patent No.: US 9,691,548 B2
(45) Date of Patent: Jun. 27, 2017

(54) HIGH-VOLTAGE CAPACITOR

(71) Applicant: COMET AG, Flamatt (CH)

(72) Inventors: Roger Tanner, Liebefeld (CH); Walter Bigler, Heitenried (CH); Mark Joachim Mildner, Rizenbach (CH); Mike Abrecht, Thörishaus (CH)

(73) Assignee: COMET AG, Flamatt (CH)

( * ) Notice: Subject to any disclaimer, the term of this patent is extended or adjusted under 35 U.S.C. 154(b) by 11 days.

(21) Appl. No.: 14/771,484

(22) PCT Filed: Mar. 19, 2013

(86) PCT No.: PCT/EP2013/055710
§ 371 (c)(1),
(2) Date: Aug. 28, 2015

(87) PCT Pub. No.: WO2014/146697
PCT Pub. Date: Sep. 25, 2014

(65) Prior Publication Data
US 2016/0005540 A1    Jan. 7, 2016

(51) Int. Cl.
*H01G 4/02* (2006.01)
*H01G 2/10* (2006.01)
*H01G 4/012* (2006.01)
*H01G 4/224* (2006.01)

(52) U.S. Cl.
CPC ............. *H01G 4/02* (2013.01); *H01G 2/10* (2013.01); *H01G 4/012* (2013.01); *H01G 4/224* (2013.01)

(58) Field of Classification Search
None
See application file for complete search history.

(56) References Cited

U.S. PATENT DOCUMENTS

| | | | | |
|---|---|---|---|---|
| 2,466,298 A * | 4/1949 | Baltensperger | .......... | H01G 4/02 361/296 |
| 3,496,431 A * | 2/1970 | Goetzl | .......... | H01G 4/02 361/279 |
| 3,646,412 A | 2/1972 | Boersma et al. | | |
| 6,170,138 B1 | 1/2001 | Von Planta et al. | | |
| 2003/0095371 A1* | 5/2003 | Cheung | .......... | H01G 4/02 361/326 |
| 2005/0231893 A1* | 10/2005 | Harvey | .......... | H01G 9/155 361/502 |

FOREIGN PATENT DOCUMENTS

| | | |
|---|---|---|
| GB | 377 221 A | 7/1932 |
| GB | 435 881 A | 10/1935 |
| GB | 748 560 A | 5/1956 |

OTHER PUBLICATIONS

International Search Report (Jan. 3, 2014) for corresponding International App. PCT/EP2013/055710.

\* cited by examiner

*Primary Examiner* — Dion R Ferguson
(74) *Attorney, Agent, or Firm* — WRB-IP LLP

(57) ABSTRACT

A high-voltage capacitor includes a gas-tight enclosure containing interleaved electrodes. The dielectric of the capacitor is a pressurized gas at a pressure of at least 6 bar, and preferably 10 or 15 bar. In order to withstand this level of internal pressure, the insulating body section of the capacitor may be formed of a high-strength polymeric material.

14 Claims, 2 Drawing Sheets

HIGH-VOLTAGE CAPACITOR

BACKGROUND AND SUMMARY

The present invention relates to the field of high-voltage capacitors and in particular, but not exclusively, to fixed and variable capacitors for use in high-power radio-frequency applications.

Common applications of high-voltage capacitors include broadcasting (eg in an oscillation circuit of a high power transmitter) or plasma controlling processes in the semiconductor, solar and flat panel manufacturing equipment (in so-called impedance matching networks). The term "high voltage" is used in the context of this description to refer to capacitor applications in which the voltage applied across the capacitor electrodes exceeds 1000 volts. Indeed, some high-voltage capacitors may be required to have breakdown voltages in excess of 10 kV. Typical operating parameter ranges for such capacitors might be, for example, an applied voltage between 10 kV and 20 kV, device current between 30 A and 150 A, operating frequencies of between 5 MHz and 30 MHz and capacitance values of between 5 pF and 5000 pF.

Such high voltage capacitors are commonly manufactured using a vacuum as the dielectric, in order to achieve the high breakdown voltage which is required. Vacuum capacitors are known for their high resistance to breakdown and for their thermal stability in operation. The vacuum chamber is pumped down to a very low pressure (typically lower than $10^{-6}$ mbar) and kept low over the entire lifetime of the device, which may be many years, by the vacuum-tight enclosure. The vacuum ensures good electrical insulation between the electrodes and very low dielectric losses in the device.

Manufacturers of high-voltage capacitors have concentrated on achieving the best possible and longest-lasting vacuum, and have had significant success in manufacturing vacuum capacitors which offer very high operating voltages (even at high operating currents and high frequencies), in a relatively small device package. However, the manufacture of such capacitors is complex, requiring high vacuum pumps, high quality materials and a high-quality welding or brazing process to join the end-caps to the (usually ceramic) capacitor walls in a vacuum-tight way. The specific joining method also limits the choice of the materials used for manufacturing the end-caps and/or electrode material, since some materials are difficult to braze or weld.

An example of a vacuum capacitor can be found in British patent GB748560, which also discloses the use of $SF_6$ as a gas dielectric, at pressures of 30 to 40 pounds per square inch (2.07 to 2.76 bar). In order to use such a capacitor for high voltages (eg 10 kV or more) with a gas dielectric at 2.76 bar, the electrode spacing would need to be large, and the overall size and weight of the device would be large as a result. However, $SF_6$ has been identified as a greenhouse gas, and the manufacture and disposal of such capacitors therefore entails significant extra complexity and cost in order to avoid emission of $SF_6$ into the atmosphere.

It is desirable to address at least some of these and other problems with prior art devices. It is desirable to provide a high-voltage capacitor which has comparable voltage and current handling characteristics to a prior art vacuum capacitor of similar size and capacitance, but which:
- is simpler to manufacture and assembly,
- requires less maintenance and monitoring,
- has an increased serviceable lifetime,
- is less susceptible to failure if the pressure inside the device changes, and/or
- permits the use of a more environmentally-friendly gas as the high-voltage dielectric.

In particular, the invention foresees a high-voltage capacitor comprising a gas-tight enclosure, the gas-tight enclosure containing a gas dielectric and at least two capacitor electrodes, wherein the pressure of the gas dielectric in the gas-tight enclosure is at least 6 bar. It is desirable to provide a method of manufacturing such a capacitor, the method comprising an assembly step of assembling the gas-tight enclosure, and a pressurizing step of filling the gas-tight enclosure with the gas dielectric to the said pressure of at least 6 bar.

According to another variant of the invention, the gas-tight enclosure comprises an insulating body section and two end caps. The insulating body section may be made at least partially of a polymeric material. The polymeric material is preferably PEEK and/or a polymeric material which is reinforced with reinforcement fibres. Such materials are strong enough in tension to withstand the elevated interior pressure, are easily machined with adequate precision, and/or do not interfere electrically with the operation of the capacitor.

According to a further variant of the invention, the pressure of the gas dielectric is at least 10 bar, or at least 15 bar. The elevated pressure inside the device allows the capacitor to be used at high voltages, as will be discussed in relation to FIG. 2.

According to another variant of the invention, the gas-tight enclosure comprises a substantially cylindrical chamber having an axial length of between 25 mm and 200 mm and/or a diameter of between 35 mm and 150 mm.

According to another variant of the invention, the breakdown voltage of the capacitor is at least 10 kV and/or the capacitance of the capacitor is between 5 pF and 5000 pF.

According, to another variant of the invention, the electrodes are made of aluminium or an alloy comprising a majority of aluminium.

According to another variant of the invention, the electrodes are formed using a non-conducting or poorly-conducting material coated with a highly-conducting material.

According to another variant of the invention, the electrodes are formed as concentric cylinders or as interleaved spirals.

According to another variant of the invention, at least one of the end caps is formed contiguously with at least one of the electrodes, from a single block of metal.

According to another variant of the invention, at least one of the end caps is secured to the insulating body section by a threaded joint.

According, to another variant of the invention, at least one of the end caps is secured to the body section by a positive-lit joint, a bayonet-fitting, by an adhesive, by welding or by brazing or soldering.

According to another variant of the invention, the gas is one of air, $N_2$ or other inert gas or mixture of inert gases. $N_2$ is preferred, since it is safe, easily available and offers good, consistent breakdown characteristics.

According to another variant of the invention, a quantity, referred to as F, is greater than 0.02, where $F=V_B \times C/V$, where V is the internal volume of the gas-tight enclosure in $mm^3$, where C is the capacitance of the capacitor in pF and where $V_B$ is the breakdown voltage of the capacitor in kV.

BRIEF DESCRIPTION OF THE DRAWINGS

The invention will now be described in detail with reference to the accompanying drawings, in which.

Figure 1A:
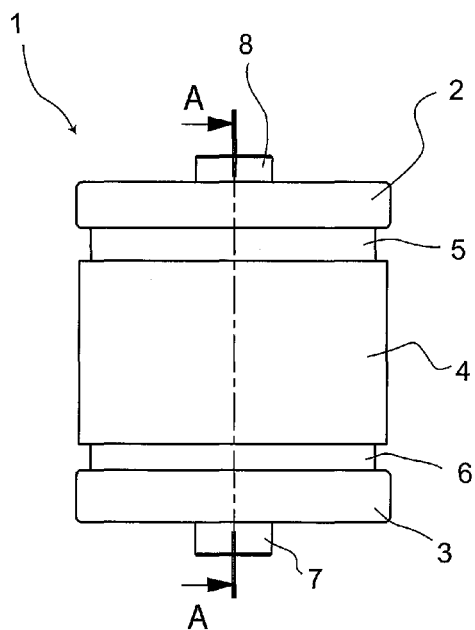
FIGS. 1a to 1c show a schematic elevation, a cross-section and a plan view respectively of an example capacitor according to the invention.
Figure 1B:
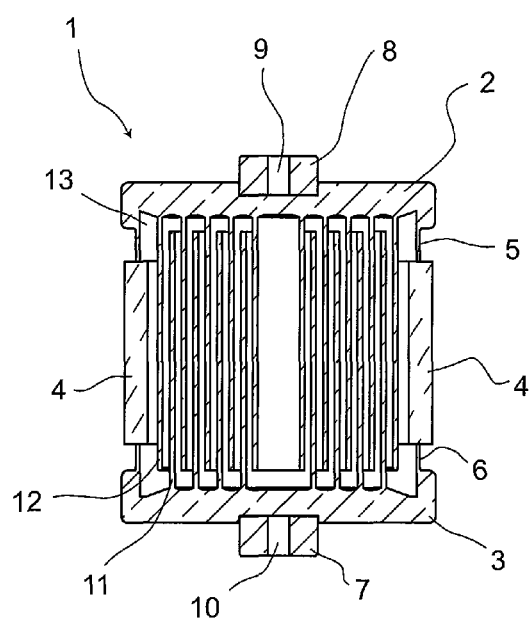
Figure 1C:
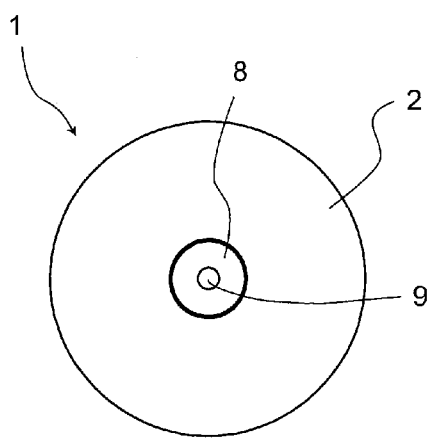

The figures are provided for illustrative purposes only, and should not be construed as limiting the scope of the claimed patent protection. For example, the example capacitor shown in the FIGS. 1a to 1c is a fixed capacitor, but it will be evident to the skilled person that the invention can also be implemented in a variable capacitor.

Where the same references have been used in different drawings, they are intended to refer to similar or corresponding features. However, the use of different references does not necessarily indicate a difference between the features to which they refer.

DETAILED DESCRIPTION

FIG. 1 illustrates an example of a cylindrical capacitor comprising two end caps 2, 3 connected to an insulating chamber wall 4 (also referred to in this application as the insulating body section) by cap joining elements 5, 6. Electrical connector points 7 and 8 may be provide, for example with threaded holes 9 and 10 for fixing connectors in a tight electrical and mechanical contact to the respective end caps 2 and 3. The end caps may be made of a metal, such as aluminium. Together, the end caps 2 and 3, the insulating chamber wall 4 and the joining elements 5 and 6 form a gas-tight enclosure. Inside the gas-tight enclosure of this example capacitor are disposed two mutually interleaved sets of electrodes 11 and 12. Each electrode may be formed as one or more concentric, cylinders, for example, or as a spiral. The electrodes 11, 12 are either secured to their respective end caps 3, 2 by a suitable fastening arrangement, or they can advantageously each be formed contiguously with their respective end cap 3, 2.

In order to simplify the manufacturing process, each end cap assembly 2, 12 or 3, 11 may be formed in one pressing, stamping, moulding or stereolithography operation. A single piece of aluminium, or a suitable alloy of aluminium, can for example be stamped or cold-pressed to produce both the end-cap and the electrode. The electrode spacing may for example be between 0.5 mm and 2 mm. A typical electrode spacing would be 1 mm.

In prior art high-voltage capacitors, the gas inside the gas-tight enclosure would be pumped out to give as high a vacuum as possible. In the capacitor of the invention, on the other hand, the gas in the capacitor is held at a pressure of at least 6 bar, and preferably at least 10 or 15 bar, for reasons which will be explained with reference to FIG. 2.

The fused silica which was used for the insulating capacitor wall in GB748560, mentioned earlier in this application, may be strong in compression but is a poor choice of material for containing gas under pressure, since fused silica does not have a high tensile strength (50 MPa). Similarly, the epoxy-glued joints between the metal end caps and the fused silica are strong in compression but much weaker in tension. For this reason, a traditional capacitor body such as the one described in GB748560 is not suitable for use at high pressures.

In order to retain such elevated pressures in the gas-tight capacitor, the dimensions and materials of the wall 4, end caps 2, 3 and joining elements 5, 6 are chosen to be sufficiently strong in tension to withstand the specified inner pressure. While aluminium or other metals may be used for the end caps 2, 3 and the joining elements 5, 6, the wall 4 must be an excellent insulator, even in high frequency operation. Various polymeric materials have been found to fulfil the insulation, porosity and strength requirements for the wall 4. For example, glass-fibre-reinforced polymer (GFRP), or basalt-reinforced polymer (BFRP) may be suitable. It has been found that polyetheretherketone (PEEK) possesses particularly suitable rigidity, tensile strength (100 MPa, or more than 170 MPa if reinforced) and insulating, properties, in addition to being highly non-porous. PEEK also has the additional advantage that its mechanical properties are highly isotropic, which means that it can be reliably formed into the required shape without the need for a large safety margin (extra thickness, for example) to account for possible areas of weakness due to any anisotropic variation within the material. It also has a low coefficient of thermal expansion and maintains its structural properties at temperatures which are typically encountered in the operation of a high-voltage radio frequency capacitor.

A further advantage of PEEK is that it can be easily machined without weakening the structure of the material. This enables the joints between the end-caps 2, 3 (or their joining elements 5, 6 and the wall 4 to be implemented as a threaded connection, for example. A female thread may be machined on an inner surface of the enclosure wall 4, for example, corresponding to a male thread on an outer surface of the (eg aluminium) end-cap 2, 3 or its joining element 3, 6, such that the gas-tight enclosure can he assembled quickly and easily by screwing, the end-cap into the cylindrical enclosure wall 4. Alternatively, the threading arrangement can be reversed, with the male thread on the outer surface of the wall 4 and the female thread on an inner surface of the end-cap 2, 3.

The capacitor can thus comprise as few as three individual parts (body section 4, and two end caps with integrally-formed electrodes), thereby significantly simplifying the manufacturing and assembly process. in this way, it is possible to machine the threaded joint with sufficient precision to simultaneously ensure a gas-tight joint, and also to locate the electrodes precisely in their required interleaved positions relative to each other.

Suitable seals can be provided by gaskets or by applying a (eg hardening) sealant to the threads during assembly. The capacitor can be assembled in a high-pressure environment of a suitable inert gas, or mixture of gases, or the assembly process can comprise a step of filling the sealed enclosure with the gas, for example through a valve.

The gas may be any suitably inert gas which permits high-voltage operation of the capacitor 1 without the occurrence of breakdown discharge. Dry air may be used, for example, or one of the noble gases, or nitrogen, or a mixture of such gases. Nitrogen has been shown to provide satisfactory results. The pressure of the gas in the capacitor is preferably above 6 bar, although pressures of 10 bar or 15 bar are advantageously found to result in even higher breakdown voltages.

The reason for selecting a pressure of 6 bar (or 10 bar or 15 bar or more) can be explained with reference to FIG. 2, which shows a schematic example of a Paschen curve for a gas or gas mixture which may be suitable for use as a dielectric in a capacitor of the invention. The curve 20 shows the relation between the breakdown voltage $V_B$ (vertical axis) for a device having electrodes in a gas dielectric at pressure P and separated by an electrode gap D (the product P×D is plotted on the horizontal axis). As can be seen from the shape of the curve, there is a value of P×D for which the breakdown voltage is a minimum (a few hundred volts, for example). In the illustrated example curve, which is schematic only, and not intended to represent exact values of the breakdown behaviour of any particular real gas, the minimum breakdown voltage occurs at a P×D value of approximately 0.01 bar if the electrode gap is 1 mm. Below this pressure, in shaded region 21, for example, the breakdown voltage increases steeply with decreasing pressure. This phenomenon can be accounted for by the greatly increased mean free path (MFP) of the gas molecules at these low pressures. It is in this region 21, below $10^{-2}$ bar mm, that high. voltage vacuum capacitors operate. The shaded region 21 thus represents the region of the Paschen curve where vacuum capacitors can operate above a specified voltage 23, such as 20 kV, for example. In order to operate at these voltages, the P×D value must be below approximately $3×10^{-2}$ bar mm.

Figure 2:
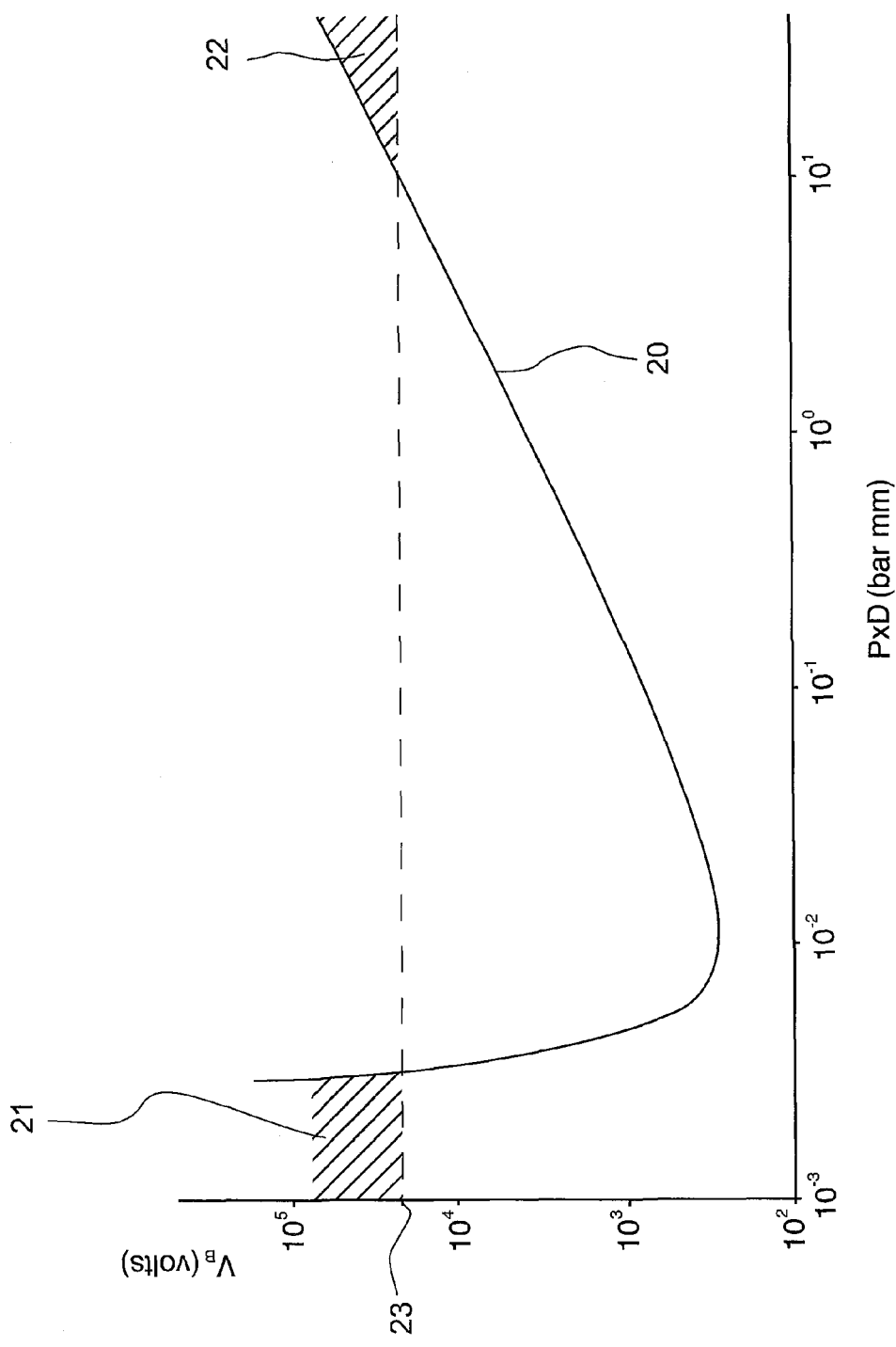
FIG. 2 shows an example of a Paschen curve which shows the breakdown voltage as a function of the product of gas pressure and electrode spacing.

However, as can be seen from FIG. 2, there is another region, 22, of the Paschen curve which allows operation above the specified voltage 23. As can be seen from the example Paschen curve 20, a P×D value of more than 10 bar mm is required for such operation. For a typical electrode separation of 1 mm, this means that a gas dielectric pressure of 10 bar will be required. Alternatively, the pressure could be reduced to, say, 5 bar, and the electrode spacing doubled. However, doubling the electrode spacing approximately halves the capacitance and at the same time more than doubles the volume required for the electrodes. In order to compensate for the halved capacitance, the area of the electrodes could be doubled. However, this again increases the volume required for the electrodes. Thus it can be seen that the volume of the capacitor, for a given capacitance value, can be reduced substantially by increasing the pressure of the dielectric gas.

In fact, for a given capacitance, the volume of a capacitor at 10 bar could. be less than a. quarter the volume of a capacitor of the same capacitance value but with a gas dielectric at 5 bar. Note that these relations are not mathematically exact, but they serve to illustrate why a capacitor containing a gas dielectric at a higher pressure can be made very much smaller than a capacitor with a as dielectric at a lower pressure.

As a first practical example, the high-pressure gas capacitor shown in FIG. 1 may be constructed with an internal diameter of 50 mm, a height (eg axial length along centre axis A-A between the inner surfaces of the end-caps 2 and 3) of 52 mm. If the electrodes are configured to give a fixed capacitance of 200 pF, for example, the capacitor can operate at an applied voltage of up to 15 kV.

A factor F can be calculated according to the relation F=U×C/V, where U is the operating voltage in kV, C is the capacitance in picofarads and V is the internal volume of the capacitor in cubic mm (the volume quantity is used because it is approximately proportional to the area of the electrodes multiplied by the electrode gap).

A larger operating voltage requirement, or a larger capacitance, or a smaller capacitor volume, will each give a higher value of F. For the above configuration with a 50 mm internal diameter, the value of F is approximately 0.03.

In a second practical example, the high-pressure gas capacitor of FIG. 1 may be constructed with at internal diameter of 60 mm, a height of 52 mm and a fixed capacitance of 200 pF. Such a capacitor can operate at an applied voltage of up to 18 kV, and has a value of F of approximately 0.025.

In a third practical example, the high-pressure gas capacitor of FIG. 1 may be constructed with an internal diameter of 70 mm, a height of 52 mm and a fixed capacitance of 200 pF. Such a capacitor can operate at an applied voltage of up to 20 kV, and has a value of F of approximately 0.02.

Since the high-voltage capacitor of the invention does not use a vacuum dielectric, it is possible to use polymeric or other materials which are not vacuum-compatible, for example because of their outgassing properties. For example, the use of a gas dielectric at a pressure above 6 bar permits the high-voltage capacitor to be manufactured using a much wider variety of materials and techniques. This is useful in the design of the electrodes, for example. At high frequencies, conduction only occurs in the outer 20 or 30 microns of the electrode material, so it is now possible to make the electrodes from a polymeric or other non-conducting or poorly-conducting material, coated with a highly-conducting material such as copper, gold or silver. Plastic electrodes may be manufactured more easily and cheaply than those of machined or pressed metal. They may be made using stereolithography, for example. The metal coating on the electrodes may advantageously be made thick enough (preferably 30 microns or more) to provide as good a conduction at high frequencies as the solid metal electrodes of a vacuum capacitor.

The invention claimed is:

1. A high-voltage capacitor comprising a gas-tight enclosure, the gas-tight enclosure containing a gas dielectric and at least two capacitor electrodes, wherein the gas-tight enclosure comprises an insulating body made entirely of polymeric material and two end caps, wherein the polymeric material is at least one of PEEK and reinforced with reinforcement fibers, and wherein a pressure of the gas dielectric in the gas-tight enclosure is at least 6 bar.

2. Method of manufacturing a high-voltage capacitor comprising a gas-tight enclosure, the gas-tight enclosure containing a gas dielectric and at least two capacitor electrodes, wherein a pressure of the gas dielectric in the gas-tight enclosure is at least 6 bar, the method comprising assembling the gas-tight enclosure, and filling the gas-tight enclosure with the gas dielectric to the said pressure of at least 6 bar.

3. A high-voltage capacitor according to claim 1, wherein the pressure is at least 10 bar, or at least 15 bar.

4. A high-voltage capacitor according to claim 1, wherein the gas-tight enclosure comprises a substantially cylindrical chamber having an axial length of between 25 mm and 200 mm and/or a diameter of between 35 mm and 150 mm.

5. A high-voltage capacitor according to claim 1, wherein the breakdown voltage of the capacitor is at least 10 kV and/or the capacitance of the capacitor is between 5 pF and 5000 pF.

6. A high-voltage capacitor according to claim 1, wherein the electrodes are made of aluminium or an alloy comprising a majority of aluminium.

7. A high-voltage capacitor according to claim 1, wherein the electrodes are comprise a non-conducting or poorly-conducting material coated with a highly-conducting material.

8. A high-voltage capacitor according to claim 1, wherein the electrodes are formed as concentric cylinders or as interleaved spirals.

9. A high-voltage capacitor according to claim 1, wherein the electrodes are formed by pressing, stamping, moulding or by stereolithography.

10. A high-voltage capacitor according to claim 1, wherein at least one of the end caps is secured to the insulating body section by a threaded joint.

11. A high-voltage capacitor according to claim 1, wherein at least one of the end caps is secured to the body section by a positive-fit joint, a bayonet-fitting, by an adhesive, by welding or by brazing or soldering.

12. A high-voltage capacitor according to claim 1, wherein the gas comprises air, $N_2$ and/or one or more inert gases.

13. A high-voltage capacitor according to claim 1, wherein a quantity, referred to as F, is greater than 0.02, where $F=V_B \times C/V$, where V is the internal volume of the gas-tight enclosure in $mm^3$, where C is the capacitance of the capacitor in pF and where $V_B$ is the breakdown voltage of the capacitor in kV.

14. A high voltage capacitor comprising a gas-tight enclosure, the gas-tight enclosure containing a gas dielectric and at least two capacitor electrodes, wherein a pressure of the gas dielectric in the gas-tight enclosure is at least 6 bar, wherein the gas-tight enclosure comprises an insulating body section and two end caps, and wherein at least one of the end caps is formed contiguously with at least one of the electrodes from a single block of metal.

* * * * *